United States Patent [19]

Rhodes, Jr.

[11] Patent Number: 4,943,107
[45] Date of Patent: Jul. 24, 1990

[54] VARIATIONS ADJUSTMENT MECHANISM FOR INSTRUMENT PANELS

[75] Inventor: Richard D. Rhodes, Jr., Somersworth, N.H.

[73] Assignee: Davidson Textron Inc., Dover, N.H.

[21] Appl. No.: 373,521

[22] Filed: Jun. 30, 1989

[51] Int. Cl.⁵ ............................................. B62D 25/14
[52] U.S. Cl. ......................................... 296/70; 296/74; 180/90; 280/752
[58] Field of Search ....................... 296/70, 72, 73, 74; 180/90; 280/732, 752

[56] References Cited

U.S. PATENT DOCUMENTS 4,350,383  9/1982  Kikuta ................................. 296/72

FOREIGN PATENT DOCUMENTS 3622165  1/1988  Fed. Rep. of Germany ........ 180/90
1031998  6/1966  United Kingdom ................. 180/90

Primary Examiner—Margaret A. Focarino
Assistant Examiner—Andrew C. Pike
Attorney, Agent, or Firm—John C. Evans

[57] ABSTRACT

An instrument panel assembly, for mounting between the front support pillars of a vehicle, includes a panel body with openings for supporting and displaying instruments and gages and extending transversely between two front support pillars of a vehicle, with the panel body having first and second ends, and the panel body further includes adjustable, compressible bellows disposed at the terminal ends of the panel body for adjustment between extended and compressed positions to provide flush engagement with the front support pillars of the vehicle.

15 Claims, 2 Drawing Sheets

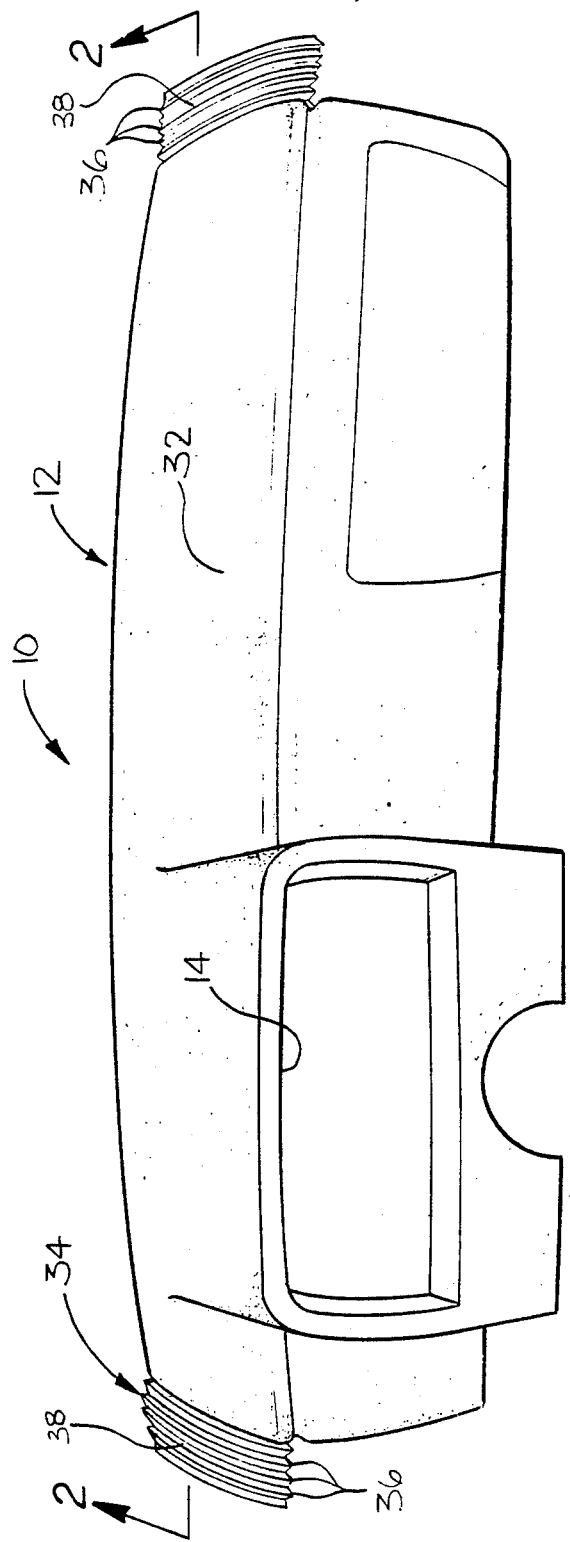
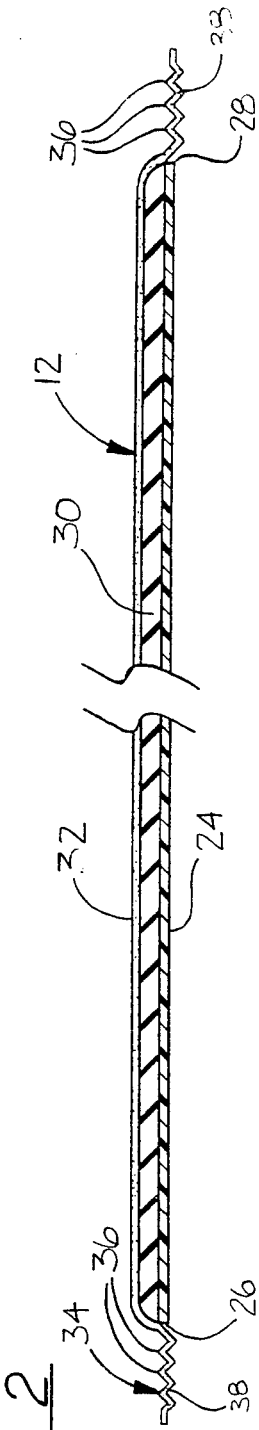
FIG. 1
FIG. 2

VARIATIONS ADJUSTMENT MECHANISM FOR INSTRUMENT PANELS

BACKGROUND OF THE INVENTION

(1) TECHNICAL FIELD

The invention relates to instrument panels employed on vehicles and the like and more specifically to an adjustment mechanism for instrument panels which facilitate the installation of a panel between the front support pillars of a vehicle.

(2) DESCRIPTION OF THE PRIOR ART

As commonly known, instrument panels are disposed in the forward part of the passenger compartment of a vehicle and are typically mounted to a bulkhead running transversely across the compartment. The panels are also sometimes fastened to the front support pillars extending generally from the bulk head to the roof for supporting the doors on a vehicle. When the panels are mounted in a vehicle, unsightly gaps often exist between the ends of the panel and the support pillars at either side of the vehicle. These gaps result from tolerance variations between the panel and the vehicle itself. More specifically, the panels are generally manufactured to much higher tolerances than the frame of the vehicle itself. Consequently, during installation of the panels, gaps from 6 to 10 millimeters can arise between the ends of the panels and the pillars.

Solutions to this problem in the prior art have been directed toward various configurations in the sheet metal of the frame at the edges of the panels for "blinding" these gaps. One example of these types of efforts can found in U.S. Pat. No. 4,350,383 issued to Kikuta on Sept. 21, 1982. The Kikuta '383 discloses an instrument board mounting structure which incorporates a specific bending configuration of the mounted portions at the edges of the panels for limiting the gap between the support pillars and the panels to a minimum. However, it appears that the mounting structure of the Kikuta '383 patent would still be hostage to the tolerance variations between the panels and the vehicle as the mounting structure of Kikuta is ultimately dependent upon the location of the corresponding mating bolt holes in the support pillars and mounting structure for receiving a fastener. Indeed, the disclosure of the Kikuta '383 patent illustrates that even while employing the mounting structure disclosed, a gap is still presented between the instrument panel and the support pillars. Further, any substantial variation in the tolerances from the design specifications would result in gaps of various sizes between the panel and support pillar.

The subject invention overcomes these problems in the prior art by employing a variation adjustment mechanism at the edges of the instrument panel which is not employed for mounting purposes but which cover any gaps between the panels and the support pillars that existed in the structures of the prior art.

SUMMARY OF THE INVENTION AND ADVANTAGES

The subject invention is directed toward an instrument panel assembly for mounting between front support pillars of a vehicle. The assembly includes a panel body with openings for supporting and displaying instruments and gages and which extends transversely between two front support pillars of a vehicle. Accordingly, the panel body has first and second terminal ends. The panel body further includes an adjustment means disposed on at least one of the terminal ends of the panel body for adjustment between extended and compressed positions to provide flush engagement with at least one of the support pillars of the vehicle.

In this way, the unsightly gaps which existed between the panel body and the front support pillars in the prior art are eliminated in an aesthetically pleasing manner.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of an instrument panel assembly illustrating the adjustment means;

FIG. 2 is a cross-sectional side view taken substantially along lines 2—2 of FIG. 1.

DESCRIPTION OF THE PREFERRED EMBODIMENT

Figure 3:
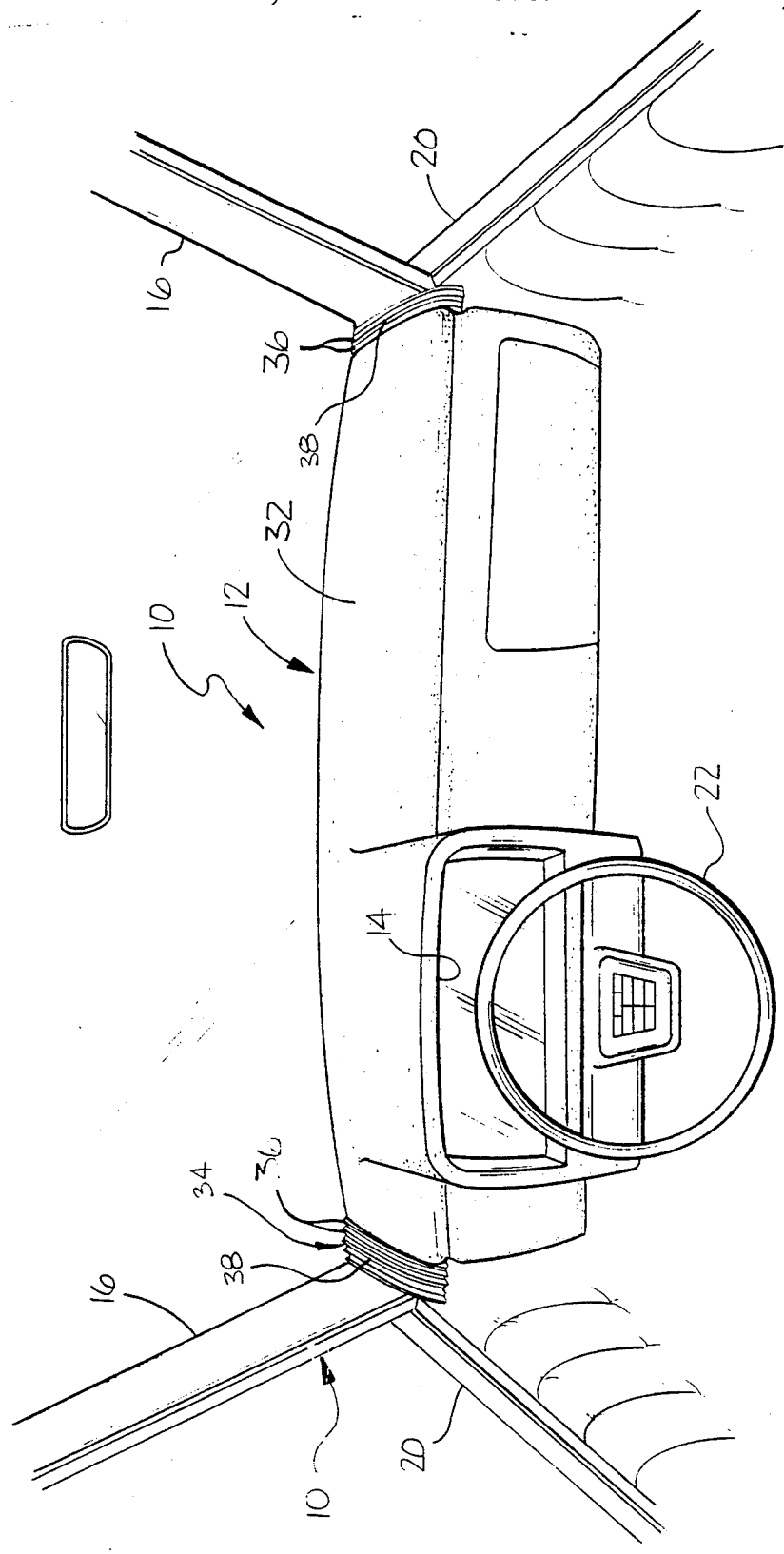
FIG. 3 is a perspective view of the passenger compartment of a vehicle including an instrument panel assembly of the subject invention.

An instrument panel assembly for mounting between front support pillars of a vehicle is generally shown at 10 in FIG. 1. The assembly includes a panel body, generally indicated at 12, with openings 14 for supporting and displaying instruments and gages and extending transversely between two front support pillars 16 of a vehicle generally indicated at 18, as shown in FIG. 3. The support pillars extend from a bulkhead (not shown) to the roof of the vehicle and support doors 20. The panel body is typically disposed in the front portion of the passenger compartment forward of the steering wheel 22. The panel body 12 includes a frame 24 having first and second terminal ends 26, 28, respectively, as shown in FIG. 2. The frame 24 is covered with a foam portion 30 to which is typically bonded a polyvinylchloride skin 32. The foam portion 30 is often made of a polyurethane foam. The polyvinylchloride skin 32 is typically vinyl as is commonly known in the art. The panel body 12 includes an adjustment means, generally indicated at 34, which is disposed on at least one of the terminal ends 26, 28 of the panel body 12. The adjustment means 34 is adjustable between extended and compressed positions to provide flush engagement with at least one of the support pillars 16 of the vehicle 18. More specifically, the adjustment means 34 is disposed at both of the first and second terminal ends 26, 28 of the panel body 12 for providing flush engagement with both of the support pillars 16 of the vehicle 18. The adjustment means 34 includes compressible bellows 38 which are adjustable between extended and compressed positions. The compressible bellows 38 include a plurality of folded portions 36 which are adjustable between extended and compressed positions. The folded portions 36 have predetermined amplitudes and periods. In the preferred embodiment, the compressible bellows 38 of the adjustment means 34 are formed integral with the panel body 12. More specifically, the bellows are formed integrally of the polyvinylchloride skin for presenting an aesthetically pleasing exterior surface.

FIG. 3 illustrates the instrument panel assembly of the subject invention mounted between the front support pillars 16 of a vehicle 18 with the compressible bellows 38 of the adjustment means 34 extending between the terminal ends 26, 28 of the panel body 12 into flush engagement with the support pillars 16. In this way, the unsightly gaps which exist between the panel bodies and the support pillars in the prior art are eliminated. Note also that the adjustment means 34 of the subject invention is not dependent upon the size of the gap presented, if any. For example, in FIG. 3, the gap at the terminal end 28 of the panel body 12 is smaller than that presented at the terminal end 26. Accordingly, the bellows 38 disposed at the terminal end 28 are compressed. Conversely, at the terminal end 26, where the gap presented is larger, the bellows are relatively expanded to cover the gap.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that within the scope of the appended claims the invention may be practiced otherwise than as specifically described.

I claim:

1. An instrument panel assembly for mounting between front support pillars of a vehicle, said assembly comprising:
   a panel body with openings for supporting and displaying instruments and gages and extending transversely between two front support pillars of the vehicle, said panel body having first and second terminal ends;
   said assembly characterized by said panel body including an adjustment means disposed on at least one of said terminal ends of said panel body for adjustment between extended and compressed positions to provide flush engagement with at least one of the front support pillars of the vehicle.

2. An assembly as set forth in claim 1 further characterized by said adjustment means disposed at both of said first and said second terminal ends of said panel body for providing flush engagement with both of the front support pillars of the vehicle.

3. An assembly as set forth in claim 2 further characterized by said adjustment means including compressible bellows which are adjustable between extended and compressed positions.

4. An assembly as set forth in claim 3 further characterized by said compressible bellows including a plurality of folded portions which are adjustable between extended and compressed positions.

5. An assembly as set forth in claim 4 further characterized by each said folded portion having a predetermined amplitude and period.

6. An assembly as set forth in claim 5 further characterized by said bellows being formed integral with said panel body.

7. An assembly as set forth in claim 1 further characterized by said panel body portion having a vinyl skin, said adjustment means being formed integrally of said vinyl skin.

8. A vehicle assembly comprising: a pair of front support pillars disposed on either side of a vehicle for supporting doors of the vehicle, an instrument panel assembly for mounting between said front support pillars, said instrument panel assembly
   including a panel body extending transversely between said two front support pillars of the vehicle and having first and second terminal ends;
   said vehicle assembly characterized by adjustment means disposed on at least one of said terminal ends of said panel body for adjustment between extended and compressed positions to provide flush engagement with at least one of the front support pillars of the vehicle.

9. A vehicle assembly as set forth in claim 8 further characterized by said adjustment means disposed at said first and said second terminal ends of said panel body for providing flush engagement with both of said pillars of the vehicle.

10. A vehicle assembly as set forth in claim 9 further characterized by said adjustment means including compressible bellows which are adjustable between extended and compressed positions.

11. A vehicle assembly as set forth in claim 10 further characterized by said compressible bellows including a plurality of folded portions which are adjustable between extended and compressed positions.

12. A vehicle assembly as set forth in claim 11 further characterized by each said folded portion having a predetermined amplitude and period.

13. A vehicle assembly as set forth in claim 12 further characterized by said bellows being formed integral with said panel body.

14. A vehicle assembly as set forth in claim 10 further characterized by said bellows being formed integral with said panel body.

15. A vehicle assembly as set forth in claim 10 further characterized by said panel body having a vinyl skin, said compressible bellows being formed integrally of said vinyl skin.

* * * * *